United States Patent [19]

Massingill

[11] Patent Number: 4,623,701

[45] Date of Patent: Nov. 18, 1986

[54] MULTIFUNCTIONAL EPOXY RESINS

[75] Inventor: John L. Massingill, Lake Jackson, Tex.

[73] Assignee: The Dow Chemical Company, Midland, Mich.

[21] Appl. No.: 753,482

[22] Filed: Jul. 10, 1985

[51] Int. Cl.[4] ........................ C08G 59/14; C08G 59/04
[52] U.S. Cl. ...................................... 525/523; 525/524; 525/533; 528/87; 528/99; 528/103; 549/516
[58] Field of Search ................. 528/87, 419, 405, 103, 528/99; 525/523, 481, 510, 524, 533; 549/516

[56] References Cited

U.S. PATENT DOCUMENTS

| | | | |
|---|---|---|---|
| 3,240,376 | 3/1966 | Smith et al. | 528/103 X |
| 3,878,132 | 4/1975 | Bertram et al. | 528/103 X |
| 4,273,921 | 6/1981 | Bertram et al. | 528/405 |
| 4,284,574 | 8/1981 | Bagga | 260/348.43 |

FOREIGN PATENT DOCUMENTS 2479822 10/1981 France .

*Primary Examiner*—Earl Nielsen
*Attorney, Agent, or Firm*—J. G. Carter

[57] ABSTRACT

Multifunctional epoxy resins are prepared by reacting (1) a polyglycidyl ether of a polyhydroxyl-containing material said glycidyl ether having an average of at least 0.05 aliphatic hydroxyl group per molecule and an average of more than one glycidyl ether group per molecule such as a diglycidyl ether of bisphenol A, (2) a hydrolyzed monoglycidyl ether of a material having one aromatic hydroxyl group such as hydrolyzed phenyl glycidyl ether or one aliphatic hydroxyl group such as hydrolyzed butyl glycidyl ether, (3) a hydrolyzed glycidyl ether of a material having an average of more than one aromatic hydroxyl group per molecule such as hydrolyzed diglycidyl ether of bisphenol A or an average of more than one aliphatic hydroxyl group per molecule such as hydrolyzed cyclohexanedimethanol diglycidyl ether, (4) the reaction product of monoglycidyl ether with a polyphenolic compound, or (5) a combination of (1), (2), (3) or (4) with an epihalohydrin such as epichlorohydrin and dehydrohalogenating the resultant halohydrin ether intermediate product with a suitable dehydrohalogenating agent such as sodium hydroxide. These epoxy resins when cured with a suitable curing agent such as methylene dianiline result in an improvement in one or more properties such as toughness, heat distortion temperature, glass transition temperature, acid resistance or the like.

55 Claims, No Drawings

MULTIFUNCTIONAL EPOXY RESINS

BACKGROUND OF THE INVENTION

The present invention concerns multifunctional epoxy resins prepared by dehydrohalogenating the reaction product of (1) a polyglycidyl ether of a polyhydroxyl-containing material said glycidyl ether having an average of at least 0.05 aliphatic hydroxyl group per molecule and an average of more than one glycidyl ether group per molecule such as a diglycidyl ether of bisphenol A, (2) a hydrolyzed monoglycidyl ether of a material having one aromatic hydroxyl group or one aliphatic hydroxyl group per molecule, (3) a hydrolyzed glycidyl ether of a material having an average of more than one aromatic hydroxyl group or aliphatic hydroxyl group per molecule, (4) the reaction product of a monoglycidyl ether with a polyphenolic compound, or (5) a combination of (1), (2), (3) or (4) with an epihalohydrin.

Multifunctional epoxy resins such as the epoxy novolac resins are well known. They are useful for many applications such as powder coatings, electronic circuit encapsulation, electrical laminates and the like. While these epoxy novolac resins have relatively good properties, the multifunctional epoxy resins possess an improvement in one or more of the properties such as toughness and/or heat distortion temperature, acid resistance and the like. These new multifunctional epoxy resins are particularly useful in the preparation of electrical laminates.

SUMMARY OF THE INVENTION

One aspect of the present invention pertains to multifunctional epoxy resins obtained by dehydrohalogenating the reaction product of (A) an epihalohydrin with (B) a material selected from (1) a polyglycidyl ether of a polyhydroxyl-containing material said glycidyl ether having an average of at least 0.05 aliphatic hydroxyl group per molecule and an average of more than one glycidyl ether group per molecule such as a diglycidyl ether of bisphenol A, (2) a hydrolyzed monoglycidyl ether of a material having one aromatic hydroxyl group or one aliphatic hydroxyl group per molecule, (3) a hydrolyzed glycidyl ether of a material having an average of more than one aromatic hydroxyl group or an average of more than one aliphatic hydroxyl group per molecule, (4) the reaction product of a monoglycidyl ether with a polyphenolic compound, or (5) a combination of (1), (2), (3) or (4).

Another aspect of the present invention pertains to a multifunctional epoxy resin represented by the formula

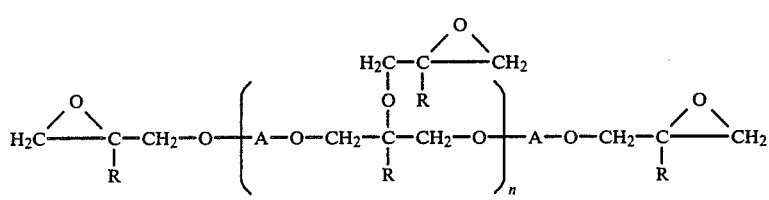

FORMULA I

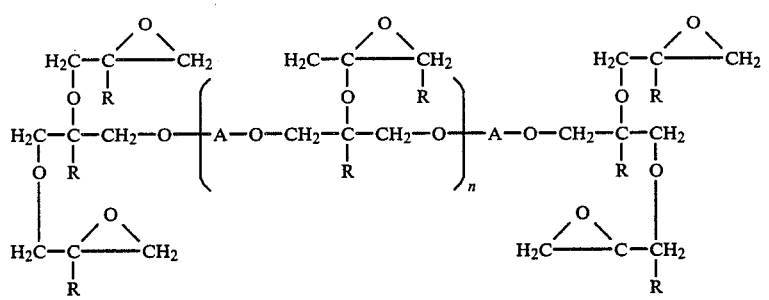

FORMULA II

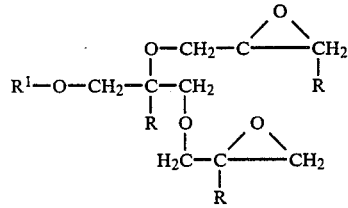

FORMULA III

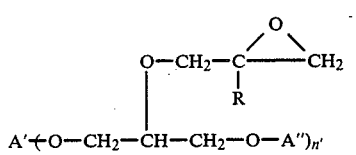

FORMULA IV wherein each A is independently the residue which would remain if the hydroxyl groups of a material having two hydroxyl groups were removed; A' is the residue which would result if the hydroxyl groups of a material having from 2 to about 10, preferably from 2 to about 4 aromatic hydroxyl groups were removed; A" is a monovalent hydrocarbyl group having from 1 to about 20, preferably from about 4 to about 10 carbon atoms; each R is independently hydrogen or an alkyl group having from 1 to about 4 carbon atoms; $R^1$ is an aliphatic or aromatic or alkyl or halogen substituted aliphatic or aromatic hydrocarbon group; n has an average value of from about 0.05 to about 150, preferably from about 0.1 to about 30 and n' has a value from 2 to about 10, preferably from 2 to about 4.

Another aspect of the present invention pertains to a mixture of epoxy resins comprising (I) from about 1 to about 99, preferably from about 50 to about 99, most preferably from about 75 to about 99 percent by weight of at least one of the aforementioned multifunctional epoxy resins and (II) from about 99 to about 1, preferably from about 50 to about 1, most preferably from about 25 to about 1 percent by weight of at least one epoxy resin having an average of more than one 1,2-epoxy group per molecule which is different from the multifunctional epoxy resin of component (A).

A further aspect of the present invention pertains to the product resulting from curing the aforementioned mixture of epoxy resins with a curing quantity of a suitable curing agent or catalyst or combination thereof.

DETAILED DESCRIPTION OF THE INVENTION

The multifunctional epoxy resins of the present invention are prepared by reacting an epoxy resin having an average of more than one 1,2-epoxide groups and an average of at least about 0.05, preferably at least about 0.4 aliphatic hydroxyl group per molecule with an epihalohydrin in the presence of a suitable catalyst thereby producing a chlorohydrin intermediate product which is subsequently dehydrohalogenated with a suitable dehydrohalogenation agent thereby producing the desired multifunctional epoxy resin.

The ratio of epihalohydrin to aliphatic hydroxyl groups is from about 1:1 to about 20:1, preferably from about 1:1 to about 5:1. This reaction can be carried out at any suitable temperature, usually at a temperature of from about 0° C. to about 100° C., preferably from about 0° C. to about 60° C. The dehydrohalogenation reaction likewise can be carried out at any suitable temperature, usually at a temperature of from about 0° C. to about 100° C., preferably from about 0° C. to about 60° C.

Suitable epihalohydrins which can be employed to prepare the multifunctional epoxy resins of the present invention include those represented by the following Formula V:

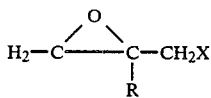

FORMULA V wherein R is hydrogen or an alkyl group having from 1 to about 4 carbon atoms and X is a halogen, preferably chlorine or bromine.

Suitable epoxy resins which can be employed to prepare the multifunctional epoxy resins of the present invention include essentially any epoxy resin which has an average of more than one 1,2-epoxy group and an average of at least about 0.05, preferably at least about 0.4 aliphatic hydroxyl group per molecule. Suitable epoxy resins which can be employed herein include those represented by the following Formulas VI, VII, VIII and IX:

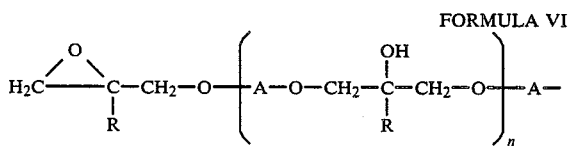

FORMULA VI

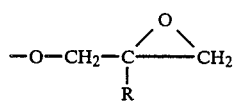

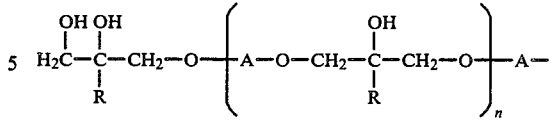

FORMULA VII

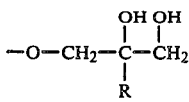

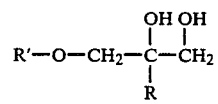

FORMULA VIII

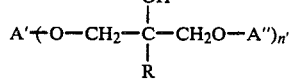

FORMULA IX wherein each A, A', A", R, R', n and n' are as defined above.

Suitable epoxy resins which can be mixed with the multifunctional epoxy resins of the present invention include any epoxy resin which has an average of more than one 1,2-epoxy groups per molecule. Among those which are suitable are those represented by Formula VI wherein each A and R are as previously defined and n has an average value from zero to about 150, preferably from zero to about 30. Also suitable are those epoxy resins represented by the following Formulas X and XI:

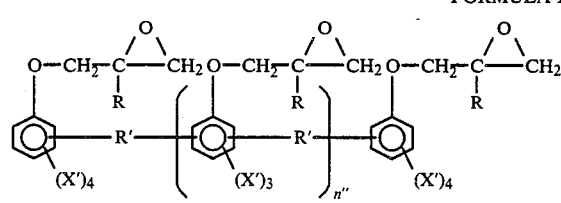

FORMULA X

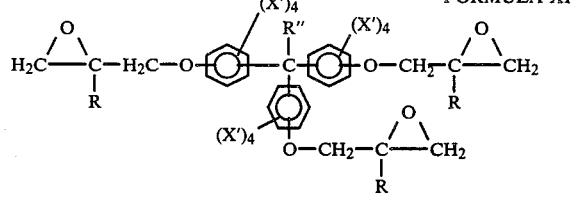

FORMULA XI wherein each R' is independently a divalent hydrocarbyl group having from 1 to about 10, preferably from 1 to about 4 carbon atoms; R" is hydrogen or a hydrocarbyl group having from about 1 to about 10, preferably from 1 to about 4 carbon atoms; each X' is independently hydrogen, a halogen preferably chlorine or bromine, or a hydrocarbyl or hydrocarbyloxy group having from about 1 to about 10, preferably from about 1 to about 4 carbon atoms; and n" has an average value of from about 0.1 to about 8, preferably from about 1 to about 3.

The term hydrocarbyl as employed herein means any aliphatic, cycloaliphatic, aromatic, aryl substituted aliphatic or aliphatic substituted aromatic groups. Likewise, the term hydrocarbyloxy group means a hydrocarbyl group having an oxygen linkage between it and the object to which it is attached.

In each of the above Formulas I and V, each A is usually represented independently by any of the Formulas XII or XIII

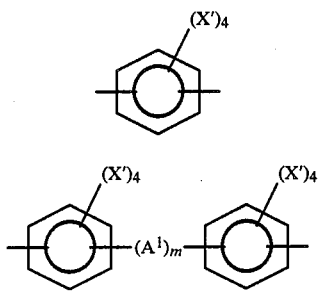

FORMULA XII

FORMULA XIII wherein X' is as previously defined; $A^1$ is a divalent hydrocarbon group having from 1 to about 10, preferably from 1 to about 4 carbon atoms, —S—, —S—S—,

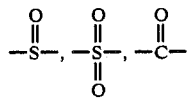

or —O—; and m has a value of zero or 1.

If desired, the epoxy resins of the present invention can be blended with other epoxy resins. Suitable such epoxy resins which can be mixed with the multifunctional epoxy resins of the present invention include any aliphatic epoxy resin such as the polyglycidyl ethers of propylene glycol, dipropylene glycol, butanediol, hexanediol, polyoxypropylene glycol, polyoxybutylene glycol, glycerine, trimethylol propane, neopentyl glycol, dibromoneopentyl glycol, mixtures thereof and the like.

Suitable dehydrohalogenation agents which can be employed to prepare the multifunctional epoxy resins of the present invention include, for example, sodium hydroxide, potassium hydroxide, sodium carbonate, potassium carbonate, sodium bicarbonate, potassium bicarbonate, combinations thereof and the like.

Suitable catalysts which can be employed to catalyze the reaction between the epihalohydrin and the epoxy resin containing aliphatic hydroxyl groups include, for example, quaternary ammonium compounds, phosphonium compounds, crown ethers, combinations thereof and the like.

Suitable curing agents which can be employed herein include, for example, primary amines, secondary amines, amidoamines, carboxylic acids and anhydrides thereof, guanidines, imidazoles, phenolic resins, melamine resins, combinations thereof and the like.

Particularly suitable curing agents include, for example, cyclohexyl diamine, methylene dianiline, combinations thereof and the like.

The multifunctional epoxy resins of the present invention are useful in the preparation of coatings, castings, adhesives, laminates, composites, encapsulants and the like.

If desired, the curable compositions can be blended with fillers, colorants, flow control agents, fire retardant agents, reinforcing materials, accelerators, combinations thereof and the like.

The following examples are illustrative of the present invention but are not to be construed as to limiting the scope thereof in any manner.

Epoxy Resin A was a mixture of the oligomers of the diglycidyl ether of bisphenol A represented by the Formula VI wherein A is the residue of bisphenol A, 22% by weight of the resin has a value of n=zero, 43% by weight of the resin has a value of n=1 with the balance of the resin having a value of n=2 or more and wherein the resin had a percent epoxide value of 16.4% and an epoxide equivalent weight of 262.2.

Epoxy Resin B was a diglycidyl ether of bisphenol A having an EEW of 1814 commercially available from The Dow Chemical Company as D.E.R. ®667.

Epoxy Resin C was a diglycidyl ether of bisphenol A having an EEW of 489 commercially available from The Dow Chemical Company as D.E.R. ®661.

Epoxy Resin D was a brominated resin prepared by advancing a diglycidyl ether of bisphenol A having an epoxide equivalent weight of 189 with tetrabromobisphenol A having an EEW of 473, a percent epoxide of 9.09 and a percent bromine of 47.5.

Curing Agent A was methylene dianiline.

EXAMPLE 1

In a reaction vessel equipped with a means for stirring, temperature recording and control, vapor condenser and bottom take-off valve 467 grams (1.87 equiv.) of Epoxy Resin A was dissolved in 1000 ml (1.78 equiv.) of epichlorohydrin. The mixture was heated to 60° C. and 40 cc of a 50% by weight aqueous solution of tetrabutyl ammonium chloride was added. Then 400 ml (7.6 equiv.) of a 50% by weight aqueous solution of sodium hydroxide was added with vigorous stirring. The temperature and agitation were maintained for 15 min. (900 s). The mixture was cooled to 30° C. and diluted with 500 ml of ice water using moderate stirring. The reaction mixture was allowed to separate and then the bottom aqueous layer was withdrawn through the bottom take-off valve. The organic layer was washed once with 200 ml of a 5% by weight aqueous solution of $NaH_2PO_4$ so as to neutralize the sodium hydroxide and then with 200 ml of deionized water. The organic layer was then subjected to vacuum evaporation to remove the volatiles from the resin. The resulting resin was viscous, but still a liquid and had an epoxide equivalent weight of 218.1 and an epoxide content of 19.7%.

The multifunctional epoxy resin prepared above and Epoxy Resin A were each cured with methylene dianiline in an amount of 1 equiv. of methylene dianiline per epoxide equivalent at a temperature of 150° C. for 2 hours (7200 s) and at 175° C. for 5 hours (18,000 s) and at 200° C. for 2 hours (7200 s). The glass transition temperature of the multifunctional resin prepared in Example 1 was 196° C. as compared to a value of 140° C. for Epoxy Resin A.

EXAMPLE 2

In a reaction vessel equipped as in Example 1, 215 g (0.67 equiv.) of Epoxy Resin B was dissolved in 2000 ml (26 equiv.) of epichlorohydrin and heated to 45° C. Then 50 ml of a 50% by weight aqueous solution of tetrabutyl ammonium chloride was added, followed by 400 ml (0.95 equiv.) of a 50% by weight aqueous solution of sodium hydroxide. The mixture was stirred vigorously for 40 min. (2400 s). The reaction mixture was cooled to 40° C. and 600 ml of ice water was added with moderate stirring. The reaction mixture was allowed to settle and the lower aqueous solution separated. Then 200 ml (3.8 equiv.) of 50% aqueous NaOH was added and stirred at 35° C. for 15 min. (900 s), after which 200 ml of deionized water was added and the stirring continued at 30° C. for an hour (3600 s) so as to effect dehydrochlorination of the halohydrin ether intermediate product. The aqueous layer removed, the resin washed and the volatiles removed as in Example 1. The resultant multifunctional epoxy resin and Epoxy Resin B were cured as in Example 1. The percent epoxide, epoxide equivalent weight (EEW) and the glass transition temperatures are given in the following table.

|  | Epoxy Resin A | Multifunctional Resin Prepared in Example 2 |
|---|---|---|
| % epoxide | 2.37 | 12.71 |
| EEW | 1814 | 338 |
| Tg, °C. | 104 | 185 |

EXAMPLE 3

In a manner similar to Example 1, a multifunctional epoxy resin was prepared from the following components:
147 grams (0.3 equiv.) of Epoxy Resin C
1000 ml (13 equiv.) of epichlorohydrin
20 ml of 50% aqueous tetrabutyl ammonium chloride
200 ml (3.8 equiv.) of 50% aqueous NaOH
The results are given in the following table.

|  | Epoxy Resin C | Multifunctional Resin Prepared in Example 2 |
|---|---|---|
| % epoxide | 8.8 | 16 |
| EEW | 489 | 269 |
| Tg, °C. | 117 | 180 |

EXAMPLE 4

In a manner similar to Example 1, a multifunctional epoxy resin was prepared from the following components:
100 grams (0.21 equiv.) of Epoxy Resin D
1000 ml (13 equiv.) of epichlorohydrin
20 ml of 50% aqueous tetrabutyl ammonium chloride
200 ml (3.8 equiv.) of 50% aqueous NaOH
The results are given in the following table.

|  | Epoxy Resin D | Multifunctional Resin Prepared in Example 2 |
|---|---|---|
| % epoxide | 9.1 | 11.85 |
| EEW | 473 | 363 |
| Tg, °C. | 165 | 180 |

I claim:

1. A multifunctional epoxy resin obtained by dehydrohalogenating the reaction product of (A) an epihalohydrin with (B) at least one material selected from those materials represented by the following formulas VI–IX

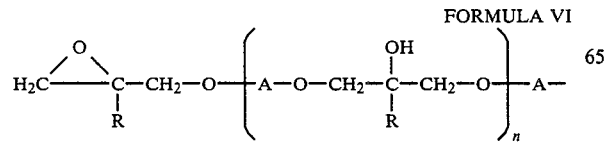

FORMULA VI

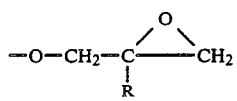

FORMULA VII

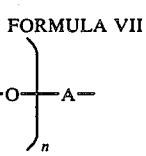

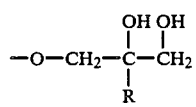

FORMULA VIII

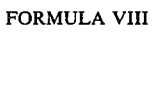

FORMULA IX

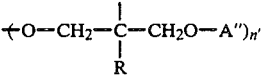

wherein each A is independently the residue which would remain if the hydroxyl groups of a material having two hydroxyl groups were removed; A' is the residue which would result if the hydroxyl groups of a material having from 2 to about 10 aromatic hydroxyl groups were removed; A" is a monovalent hydrocarbyl group having from 1 to about 20 carbon atoms; each R is independently hydrogen or an alkyl group having from 1 to about 4 carbon atoms; $R^1$ is an aliphatic or aromatic or alkyl or halogen substituted aliphatic or aromatic hydrocarbon group; n has an average value of from about 0.5 to about 150 and n' has a value from 2 to about 10.

2. A multifunctional epoxy resin of claim 1 wherein component A is epichlorohydrin and component (B) is a material represented by the formulas

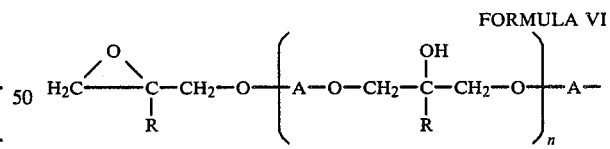

FORMULA VI

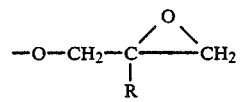

FORMULA VII

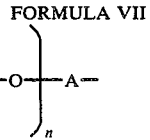

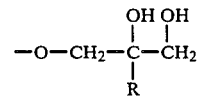

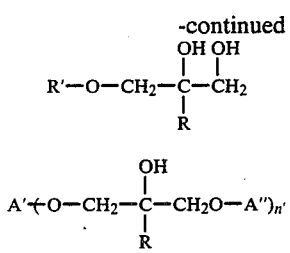

FORMULA VIII

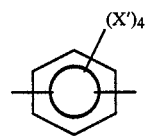

FORMULA IX value of zero or 1; n has an average value of from about 0.1 to about 150 and n' has a value from 2 to about 10.

3. A multifunctional epoxy resin of Claim 2 wherein in component B, A is represented by Formula XIII, A" is a divalent hydrocarbon group having from 1 to about 4 carbon atoms; each X' is independently hydrogen, bromine or methyl; m has a value of 1 and n has an average value of from about 0.4 to about 30.

4. A multifunctional epoxy resin represented by the following formulas I, II, III or IV

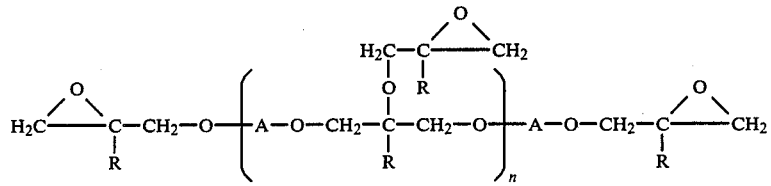

FORMULA I

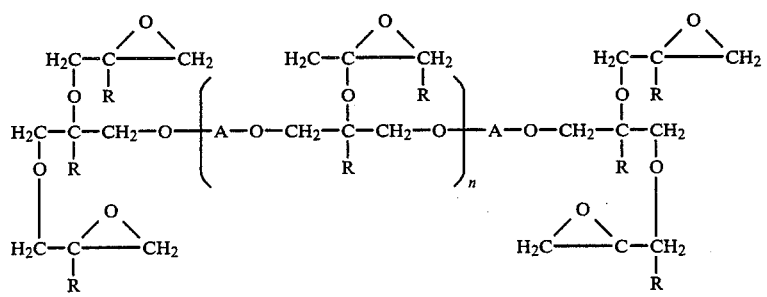

FORMULA II

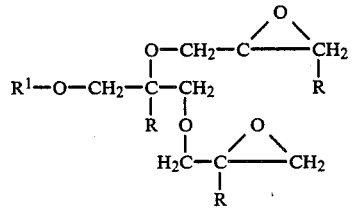

FORMULA III

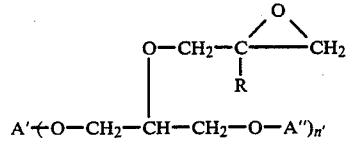

FORMULA IV wherein each A is independently represented by the formulas

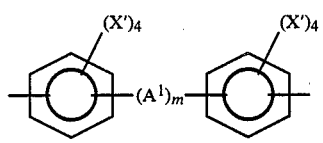

FORMULA XII

FORMULA XIII $A^1$ and A" are a divalent hydrocarbon group having from 1 to about 4 carbon atoms, —S—, —S—S—,

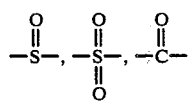

or —O—; each R is hydrogen; R' is an aliphatic or aromatic or alkyl or halogen substituted aliphatic or aromatic hydrocarbon group; each X' is independently hydrogen, halogen or a hydrocarbyl or hydrocarbyloxy group having from 1 to about 4 carbon atoms; m has a wherein each A is independently the residue which would remain if the hydroxyl groups of a material having two hydroxyl groups were removed; A' is the residue which would result if the hydroxyl groups of a material having from 2 to about 10 aromatic hydroxyl groups were removed; A" is a monovalent hydrocarbyl group having from 1 to about 20 carbon atoms; each R is independently hydrogen or an alkyl group having from 1 to about 4 carbon atoms; and n has an average value of from about 0.05 to about 150.

5. A multifunctional epoxy resin of claim 4 wherein said multifunctional epoxy resin is represented by formula I and n has an average value of from about 0.4 to about 30.

6. A mixture of epoxy resins comprising (I) from about 1 to about 99 percent by weight of at least one multifunctional epoxy resin of claims 1, 2, or 3 and (II) from about 99 to about 1 percent by weight of at least one epoxy resin having an average of more than one 1,2-epoxy group per molecule which is different from the multifunctional epoxy resin of component (A).

7. A mixture of epoxy resins of claim 6 wherein
(i) component (I) is present in a quantity of from about 50 to about 99 percent by weight;
(ii) component (II) is present in a quantity of from about 50 to about 1 percent by weight;

(iii) component (I) is a multifunctional epoxy resin of claim 2 wherein component A is epichlorohydrin and component (B) is a material represented by the following formulas VI, VII, VIII, IX, X or XI FORMULA VI
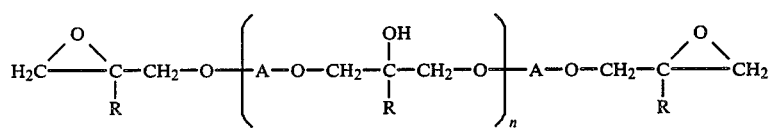

FORMULA VII
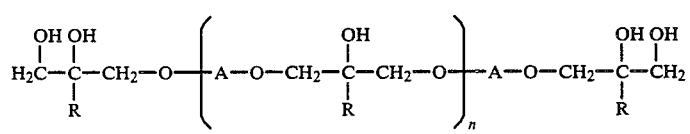

FORMULA VIII
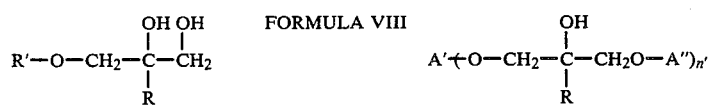

FORMULA IX
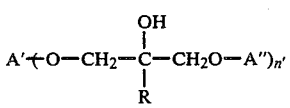

FORMULA X
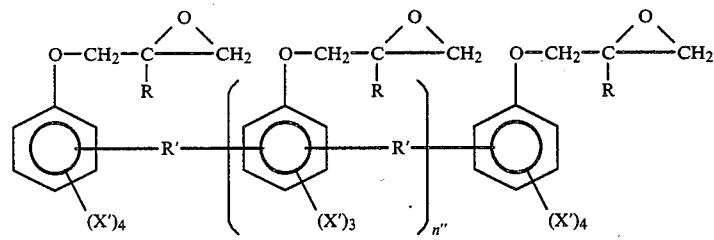

FORMULA XI
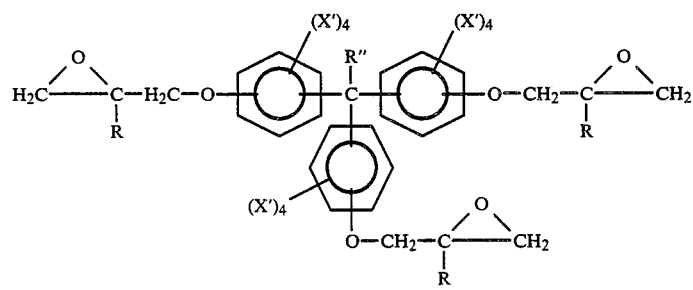

wherein each A is independently represented by the formulas

FORMULA XII
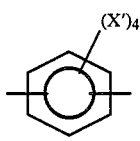

FORMULA XIII
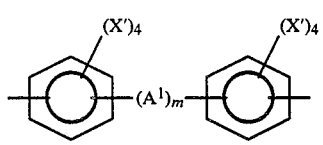

$A^1$ is a divalent hydrocarbon group having from 1 to about 10 carbon atoms, —S—, —S—S—, $$-\underset{\underset{O}{\|}}{S}-,\ -\underset{\underset{O}{\|}}{\overset{\overset{O}{\|}}{S}}-,\ -\overset{\overset{O}{\|}}{C}-$$

or —O—; A' is the residue which would result if the hydroxyl groups of a material having from 2 to about 10 aromatic hydroxyl groups were removed; A" is a monovalent hydrocarbyl group having from 1 to about 20 carbon atoms; R is hydrogen; each X' is independently hydrogen, halogen or a hydrocarbyl or hydrocarbyloxy group having from 1 to about 4 carbon atoms; m has a value of zero or 1; n has an average value of from about 0.05 to about 150 and n' has a value from 2 to 10;

(iv) component (II) is a polyglycidyl ether of a polyhydroxyl-containing aliphatic compound, a polyglycidyl ether of a polyhydroxyl-containing aromatic compound or a mixture thereof.

8. A mixture of epoxy resins of claim 6 wherein
 (i) component (I) is present in a quantity of from about 75 to about 99 percent by weight;
 (ii) component (II) is present in a quantity of from about 25 to about 1 percent by weight;
 (iii) component (I) is a multifunctional epoxy resin of Claim 3 wherein component (B) is an epoxy resin represented by formula VI wherein A is represented by formula XIII; each X' is independently hydrogen, bromine or methyl; m has a value of 1 and n has an average value of from about 0.05 to about 30;
 (iv) component (II) is a a diglycidyl ether of a bisphenol.

9. A mixture of epoxy resins comprising (I) from about 1 to about 99 percent by weight of at least one multifunctional epoxy resin of claim 4 and (II) from about 99 to about 1 percent by weight of at least one epoxy resin having an average of more than one 1,2-epoxy group per molecule which is different from the multifunctional epoxy resin of component (I).

10. A mixture of epoxy resins of claim 9 wherein
   (i) component (I) is present in a quantity of from about 50 to about 99 percent by weight;
   (ii) component (II) is present in a quantity of from about 50 to about 1 percent by weight;
   (iii) in component (I) n has an average value of from about 0.1 to about 150;
   (iv) component (II) is a polyglycidyl ether of a polyhydroxyl-containing aliphatic compound, a polyglycidyl ether of a polyhydroxyl-containing aromatic compound or a mixture thereof.

11. A mixture of epoxy resins of claim 10 wherein
   (i) component (I) is present in a quantity of from about 75 to about 99 percent by weight;
   (ii) component (II) is present in a quantity of from about 25 to about 1 percent by weight;
   (iii) component (II) is a diglycidyl ether of a bisphenol.

12. A product resulting from curing a composition comprising an epoxy resin of claim 1 and a curing quantity of a suitable curing agent or catalyst therefor or a combination thereof.

13. A product of claim 12 wherein said curing agent is aliphatic amines, cycloaliphatic amines, aromatic amines, amidoamines, melamines, phenolics, carboxylic acids, carboxylic acid anhydrides, or a combination thereof.

14. A product of claim 13 wherein said curing agent is a methylenedianiline, aminoethylpiperazine, diaminocyclohexane, diethylenetriamine, nadic methyl anhydride, dicyandiamide, diaminodiphenylsulfone, polyamide, or a combination thereof.

15. A product of claim 14 wherein said product is a coating or a laminate or a composite or an encapsulant.

16. A product resulting from curing a composition comprising an epoxy resin of claim 2 and a curing quantity of a suitable curing agent or catalyst therefor or a combination thereof.

17. A product of claim 16 wherein said curing agent is aliphatic amines, cycloaliphatic amines, aromatic amines, amidoamines, melamines, phenolics, carboxylic acids, carboxylic acid anhydrides, or a combination thereof.

18. A product of claim 17 wherein said curing agent is a methylenedianiline, aminoethylpiperazine, diaminocyclohexane, diethylenetriamine, nadic methyl anhydride, dicyandiamide, diaminodiphenylsulfone, polyamide, or a combination thereof.

19. A product of claim 18 wherein said product is a coating or a laminate or a composite or an encapsulant.

20. A product resulting from curing a composition comprising an epoxy resin of claim 3 and a curing quantity of a suitable curing agent or catalyst therefor or a combination thereof.

21. A product of claim 20 wherein said curing agent is apliphatic amines, cycloaliphatic amines, aromatic amines, amidoamines, melamines, phenolics, carboxylic acids, carboxylic acid anhydrides, or a combination thereof.

22. A product of claim 21 wherein said curing agent is a methylenedianiline, aminoethylpiperazine, diaminocyclohexane, diethylenetriamine, nadic methyl anhydride, dicyandiamide, diaminodiphenysulfone, polyamide, or a combination thereof.

23. A product of claim 22 wherein said product is a coating or a laminate or a composite or an encapsulant.

24. A product resulting from curing a composition comprising an epoxy resin of claim 4 and a curing quantity of a suitable curing agent or catalyst therefor or a combination thereof.

25. A product of claim 24 wherein said curing agent is aliphatic amines, cycloaliphatic amines, aromatic amines, amidoamines, melamines, phenolics, carboxylic acids, carboxylic acid anhydrides, or a combination thereof.

26. A product of claim 25 wherein said curing agent is a methylenedianiline, aminoethylpiperazine, diaminocyclohexane, diethylenetriamine, nadic methyl anhydride, dicyandiamide, diaminodiphenylsulfone, polyamide, or a combination thereof.

27. A product of claim 26 wherein said product is a coating or a laminate or a composite or an encapsulant.

28. A product resulting from curing a composition comprising an epoxy resin of claim 5 and a curing quantity of a suitable curing agent or catalyst therefor or a combination thereof.

29. A product of claim 28 wherein said curing agent is aliphatic amines, cycloaliphatic amines, aromatic amines, amidoamines, melamines, phenolics, carboxylic acids, carboxylic acid anhydrides, or a combination thereof.

30. A product of claim 29 wherein said curing agent is a methylenedianiline, aminoethylpiperazine, diaminocyclohexane, diethylenetriamine, nadic methyl anhydride, dicyandiamide, diaminodiphenylsulfone, polyamide, or a combination thereof.

31. A product of claim 30 wherein said product is a coating or a laminate or a composite or an encapsulant.

32. A product resulting from curing a composition comprising an epoxy resin of claim 6 and a curing quantity of a suitable curing agent or catalyst therefor or a combination thereof.

33. A product of claim 32 wherein said curing agent is aliphatic amines, cycloaliphatic amines, aromatic amines, amidoamines, melamines, phenolics, carboxylic acids, carboxylic acid anhydrides, or a combination thereof.

34. A product of claim 33 wherein said curing agent is a methylenedianiline, aminoethylpiperazine, diaminocyclohexane, diethylenetriamine, nadic methyl anhydride, dicyandiamide, diaminodiphenylsulfone, polyamide, or a combination thereof.

35. A product of claim 34 wherein said product is a coating or a laminate or a composite or an encapsulant.

36. A product resulting from curing a composition comprising an epoxy resin of claim 7 and a curing quantity of a suitable curing agent or catalyst therefor or a combination thereof.

37. A product of claim 35 wherein said curing agent is aliphatic amines, cycloaliphatic amines, aromatic amines, amidoamines, melamines, phenolics, carboxylic acids, carboxylic acid anhydrides, or a combination thereof.

38. A product of claim 37 wherein said curing agent is a methylenedianiline, aminoethylpiperazine, diaminocyclohexane, diethylenetriamine, nadic methyl anhydride, dicyandiamide, diaminodiphenysulfone, polyamide, or a combination thereof.

39. A product of claim 38 wherein said product is a coating or a laminate or a composite or an encapsulant.

40. A product resulting from curing a composition comprising an epoxy resin of claim 8 and a curing quantity of a suitable curing agent or catalyst therefor or a combination thereof.

41. A product of claim 40 wherein said curing agent is aliphatic amines, cycloaliphatic amines, aromatic amines, amidoamines, melamines, phenolics, carboxylic acids, carboxylic acid anhydrides, or a combination thereof.

42. A product of claim 41 wherein said curing agent is a methylenedianiline, aminoethylpiperazine, diaminocyclohexane, diethylenetriamine, nadic methyl anhydride, dicyandiamide, diaminodiphenylsulfone, polyamide, or a combination thereof.

43. A product of claim 42 wherein said product is a coating or a laminate or a composite or an encapsulant.

44. A product resulting from curing a composition comprising an epoxy resin of claim 9 and a curing quantity of a suitable curing agent or catalyst therefor or a combination thereof.

45. A product of claim 44 wherein said curing agent is aliphatic amines, cycloaliphatic amines, aromatic amines, amidoamines, melamines, phenolics, carboxylic acids, carboxylic acid anhydrides, or a combination thereof.

46. A product of claim 45 wherein said curing agent is a methylenedianiline, aminoethylpiperazine, diaminocyclohexane, diethylenetriamine, nadic methyl anhydride, dicyandiamide, diaminodiphenylsulfone, polyamide, or a combination thereof.

47. A product of claim 46 wherein said product is a coating or a laminate or a composite or an encapsulant.

48. A product resulting from curing a composition comprising an epoxy resin of claim 10 and a curing quantity of a suitable curing agent or catalyst therefor or a combination thereof.

49. A product of claim 48 wherein said curing agent is aliphatic amines, cycloaliphatic amines, aromatic amines, amidoamines, melamines, phenolics, carboxylic acids, carboxylic acid anhydrides, or a combination thereof.

50. A product of claim 49 wherein said curing agent is a methylenedianiline, aminoethylpiperazine, diaminocyclohexane, diethylenetriamine, nadic methyl anhydride, dicyandiamide, diaminodiphenylsulfone, polyamide, or a combination thereof.

51. A product of claim 50 wherein said product is a coating or a laminate or a composite or an encapsulant.

52. A product resulting from curing a composition comprising an epoxy resin of claim 11 and a curing quantity of a suitable curing agent or catalyst therefor or a combination thereof.

53. A product of claim 52 wherein said curing agent is aliphatic amines, cycloaliphatic amines, aromatic amines, amidoamines, melamines, phenolics, carboxylic acids, carboxylic acid anhydrides, or a combination thereof.

54. A product of claim 53 wherein said curing agent is a methylenedianiline, aminoethylpiperazine, diaminocyclohexane, diethylenetriamine, nadic methyl anhydride, dicyandiamide, diaminodiphenylsulfone, polyamide, or a combination thereof.

55. A product of claim 54 wherein said product is a coating or a laminate or a composite or an encapsulant.

* * * * *

UNITED STATES PATENT AND TRADEMARK OFFICE
CERTIFICATE OF CORRECTION

PATENT NO. : 4,623,701

DATED : November 18, 1986

INVENTOR(S) : John L. Massingill

It is certified that error appears in the above-identified patent and that said Letters Patent is hereby corrected as shown below:

Cols. 1 & 2 and Cols. 9 & 10, please delete Formula II and insert therefor the following corrected Formula II:

FORMULA II

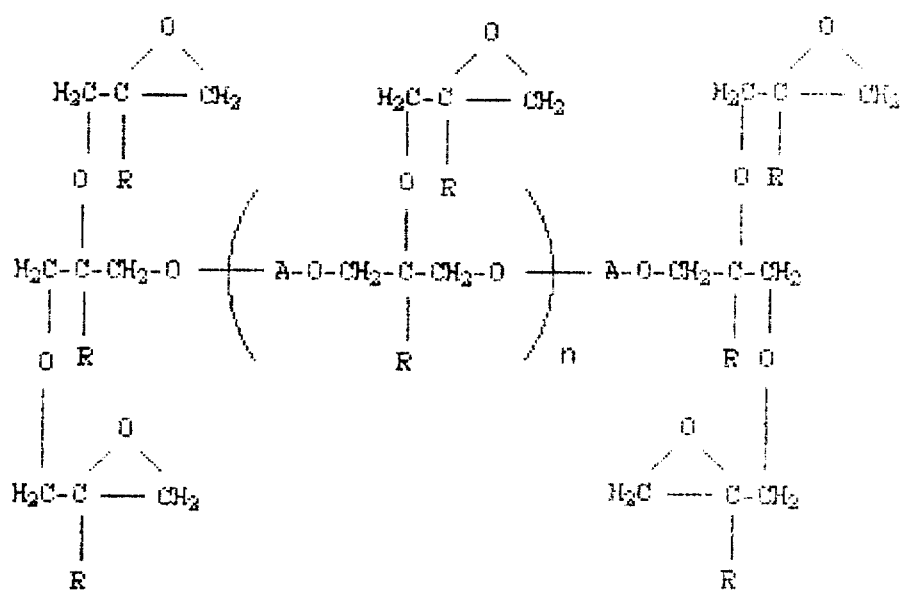

UNITED STATES PATENT AND TRADEMARK OFFICE
CERTIFICATE OF CORRECTION

PATENT NO. : 4,623,701

DATED : November 18, 1986

INVENTOR(S) : John L. Massingill

It is certified that error appears in the above-identified patent and that said Letters Patent is hereby corrected as shown below:

Col. 8, line 40; change "0.5" to --0.05--.

Col. 13, line 62, Claim 21; change "apliphatic" to --aliphatic--.

Col. 14, line 1, Claim 22; change "diaminodiphenysulfone" to --diaminodiphenylsulfone--.

Col. 14, line 65, Claim 38; change "diaminodiphenysulfone" to --diaminodiphenylsulfone--.

Signed and Sealed this

Twenty-sixth Day of January, 1988

Attest:

DONALD J. QUIGG

*Attesting Officer*   *Commissioner of Patents and Trademarks*